United States Patent
Ray et al.

(10) Patent No.: US 11,302,323 B2
(45) Date of Patent: Apr. 12, 2022

(54) VOICE RESPONSE DELIVERY WITH ACCEPTABLE INTERFERENCE AND ATTENTION

(71) Applicant: International Business Machines Corporation, Armonk, NY (US)

(72) Inventors: Shubhadip Ray, Secaucus, NJ (US); Sarbajit K. Rakshit, Kolkata (IN); Avik Sanyal, Kolkata (IN); Craig M. Trim, Ventura, CA (US)

(73) Assignee: International Business Machines Corporation, Armonk, NY (US)

( * ) Notice: Subject to any disclaimer, the term of this patent is extended or adjusted under 35 U.S.C. 154(b) by 250 days.

(21) Appl. No.: 16/690,915

(22) Filed: Nov. 21, 2019

(65) Prior Publication Data

US 2021/0158808 A1    May 27, 2021

(51) Int. Cl.
*G10L 15/22* (2006.01)
*G06N 20/00* (2019.01)
*G08B 21/18* (2006.01)
*G08B 3/10* (2006.01)
*G10L 15/18* (2013.01)

(52) U.S. Cl.
CPC ............ *G10L 15/22* (2013.01); *G06N 20/00* (2019.01); *G08B 3/10* (2013.01); *G08B 21/182* (2013.01); *G10L 15/1815* (2013.01); *G10L 2015/223* (2013.01)

(58) Field of Classification Search
CPC ........ G08B 3/10; G08B 21/182; G06N 20/00; G10L 15/1815; G10L 15/22; G10L 2015/223
See application file for complete search history.

(56) References Cited

U.S. PATENT DOCUMENTS

| | | | |
|---|---|---|---|
| 6,760,722 B1 * | 7/2004 | Raghunandan | ........ G06N 5/046 |
| 6,912,517 B2 | 6/2005 | Agnihotri et al. | |
| 7,062,561 B1 * | 6/2006 | Reisman | ................. G06F 16/00 |
| | | | 709/227 |
| 7,930,676 B1 | 4/2011 | Thomas | |

(Continued)

FOREIGN PATENT DOCUMENTS

| | | |
|---|---|---|
| CN | 1507701 A | 6/2004 |
| CN | 101208742 A | 6/2008 |
| CN | 101385385 A | 3/2009 |

OTHER PUBLICATIONS

Eyben et al. "Emotion on the road—Necessity, Acceptance, and Feasibility of Affective Computing in the Car." Advances in Human-Computer Interaction, vol. 2010, Article ID 263593, 17 pgs.

(Continued)

*Primary Examiner* — Eric Yen
(74) *Attorney, Agent, or Firm* — Mark Bergner (57) ABSTRACT

A computer-implemented method comprises receiving an audio user request, converting the request into a digitized request using natural language processing. A determination is made, based on a measured user attentiveness level, of a suitability of responding to the user request. Responsive to a determination that the suitability of responding is above a predetermined threshold value, the method comprises providing a response to the user request.

20 Claims, 5 Drawing Sheets

(56) References Cited

U.S. PATENT DOCUMENTS

| | | | | |
|---|---|---|---|---|
| 8,065,151 | B1* | 11/2011 | Bangalore | G10L 15/193 704/270 |
| 8,292,433 | B2* | 10/2012 | Vertegaal | H04N 7/18 351/209 |
| 8,655,950 | B2 | 2/2014 | Scherpa et al. | |
| 8,788,517 | B2* | 7/2014 | Horvitz | G06F 16/951 707/759 |
| 8,938,394 | B1* | 1/2015 | Faaborg | G06F 3/167 704/275 |
| 9,432,768 | B1* | 8/2016 | O'Neill | H04R 3/005 |
| 9,813,495 | B1* | 11/2017 | Van Rensburg | G06Q 30/02 |
| 10,489,393 | B1* | 11/2019 | Mittal | G06F 16/243 |
| 10,552,695 | B1* | 2/2020 | Bush | B60W 40/09 |
| 10,764,232 | B1* | 9/2020 | Yanes | H04L 51/046 |
| 11,055,355 | B1* | 7/2021 | Monti | G10L 15/22 |
| 2006/0285654 | A1* | 12/2006 | Nesvadba | H04N 5/60 379/67.1 |
| 2007/0127704 | A1 | 6/2007 | Marti et al. | |
| 2008/0107286 | A1* | 5/2008 | Nakajima | G10L 15/20 381/110 |
| 2008/0168168 | A1 | 7/2008 | Hamilton et al. | |
| 2011/0301956 | A1* | 12/2011 | Sano | G10L 15/26 704/270 |
| 2013/0017523 | A1* | 1/2013 | Barborak | G06N 5/04 434/322 |
| 2014/0120961 | A1* | 5/2014 | Buck | H04W 4/12 455/466 |
| 2014/0139655 | A1* | 5/2014 | Mimar | G08B 21/0476 348/77 |
| 2014/0222436 | A1* | 8/2014 | Binder | G10L 15/26 704/275 |
| 2014/0280915 | A1 | 9/2014 | Nemer et al. | |
| 2015/0149179 | A1* | 5/2015 | Korbecki | G10L 13/00 704/260 |
| 2015/0261387 | A1* | 9/2015 | Petersen | G06F 3/0481 715/765 |
| 2016/0019293 | A1* | 1/2016 | Bhagwat | G06F 16/248 707/732 |
| 2016/0313868 | A1* | 10/2016 | Weng | H04L 67/12 |
| 2017/0186428 | A1* | 6/2017 | Kunitake | G06F 3/167 |
| 2017/0223413 | A1* | 8/2017 | Kozloski | H04N 21/462 |
| 2017/0364519 | A1* | 12/2017 | Beller | G06N 7/005 |
| 2018/0011937 | A1* | 1/2018 | Tikhonov | G06F 16/9535 |
| 2018/0089305 | A1* | 3/2018 | Croutwater | G06F 16/3329 |
| 2018/0285777 | A1* | 10/2018 | Li | G06Q 10/06 |
| 2018/0288481 | A1* | 10/2018 | Goyal | G09B 5/065 |
| 2019/0019094 | A1* | 1/2019 | Mengle | G06N 7/005 |
| 2019/0070735 | A1* | 3/2019 | Tappeiner | G06K 9/00335 |
| 2019/0122667 | A1* | 4/2019 | Andersen | G06F 40/30 |
| 2019/0163692 | A1* | 5/2019 | Duan | G06F 16/00 |
| 2019/0164103 | A1* | 5/2019 | Ashraf | G06Q 10/1095 |
| 2019/0213465 | A1* | 7/2019 | Avrahami | G10L 15/197 |
| 2019/0213476 | A1* | 7/2019 | Singh | G06N 3/0445 |
| 2019/0236643 | A1* | 8/2019 | Achan | G06Q 30/0271 |
| 2019/0251701 | A1* | 8/2019 | Shukla | G06F 3/013 |
| 2019/0259045 | A1* | 8/2019 | Bower | G06Q 30/0201 |
| 2019/0261370 | A1* | 8/2019 | Amini | H04L 43/0858 |
| 2019/0279647 | A1* | 9/2019 | Jones | G10L 21/18 |
| 2019/0371299 | A1* | 12/2019 | Jiang | G06N 5/00 |
| 2020/0184262 | A1* | 6/2020 | Chui | A61B 5/7267 |
| 2021/0026449 | A1* | 1/2021 | Chan | A61B 5/6817 |

OTHER PUBLICATIONS

Kamm et al., "The Role of Speech Processing in Human-Computer Intelligent Communication." Speech Communication 23.4 (1997): 263-278.

Statista, "Smart speaker market revenue worldwide in 2017, 2018 and 2022 (in billion U.S. dollars)," The Statistics Portal, https://www.statista.com/statistics/822511/worldwide-smart-speaker-market-revenue/, printed Apr. 2, 2019, 3 pgs.

Mell et al., "The NIST Definition of Cloud Computing: Recommendations of the National Institute of Standards and Technology," Special Publication 800-145, Sep. 2011, 7 pages, National Institute of Standards and Technology, Gaithersburg, MD.

* cited by examiner

VOICE RESPONSE DELIVERY WITH ACCEPTABLE INTERFERENCE AND ATTENTION

BACKGROUND

Voice response systems have become popular convenience devices for consumers, making user-computer interaction faster and simpler. Although advances have improved the interaction between the user and computer for such interactions, there remains room for improvement.

SUMMARY

According to one aspect disclosed herein, a computer-implemented method comprises receiving an audio user request, converting the request into a digitized request using natural language processing. A determination is made, based on a measured user attentiveness level, of a suitability of responding to the user request. Responsive to a determination that the suitability of responding is above a predetermined threshold value, the method comprises providing a response to the user request.

According to another aspect disclosed herein, a voice response deliver system is provided, comprising a processor configured to receive an audio user request. It then converts the request into a digitized request using natural language processing. A suitability of responding value (SRV) is determined, and, responsive to the determination that the SRV is equal to or above a predetermined threshold value, a response is provided to the user request.

Furthermore, embodiments may take the form of a related computer program product, accessible from a computer-usable or computer-readable medium providing program code for use, by, or in connection, with a computer or any instruction execution system. For the purpose of this description, a computer-usable or computer-readable medium may be any apparatus that may contain a mechanism for storing, communicating, propagating or transporting the program for use, by, or in connection, with the instruction execution system, apparatus, or device.

BRIEF DESCRIPTION OF THE DRAWINGS

Various embodiments are described herein with reference to different subject-matter. In particular, some embodiments may be described with reference to methods, whereas other embodiments may be described with reference to apparatuses and systems. However, a person skilled in the art will gather from the above and the following description that, unless otherwise notified, in addition to any combination of features belonging to one type of subject-matter, also any combination between features relating to different subject-matter, in particular, between features of the methods, and features of the apparatuses and systems, are considered as to be disclosed within this document.

The aspects defined above, and further aspects disclosed herein, are apparent from the examples of one or more embodiments to be described hereinafter and are explained with reference to the examples of the one or more embodiments, but to which the invention is not limited. Various embodiments are described, by way of example only, and with reference to the following drawings.

DETAILED DESCRIPTION

In order to better respond to user inquiries when using a smart speaker device, a suitability of responding value may be utilized to determine when a user may be responded to without undue distraction. The suitability of responding value may take into account both the user's attentiveness as well as context information about the user's environment. When the suitability of responding value equals or exceeds a predefined threshold, the response may be delivered to the user with minimal risk of the user being distracted. Otherwise, attempts may be made to reduce the suitability of responding value before proceeding with a user response.

The following acronyms may be used below:
API application program interface
ARM advanced RISC machine
CD-ROM compact disc ROM
CMS content management system
CoD capacity on demand
CPU central processing unit
CUoD capacity upgrade on demand
DPS data processing system
DVD digital versatile disk
EPROM erasable programmable read-only memory
FPGA field-programmable gate arrays
HA high availability
IaaS infrastructure as a service
I/O input/output
IPL initial program load
ISP Internet service provider
ISA instruction-set-architecture
LAN local-area network
LPAR logical partition
PaaS platform as a service
PDA personal digital assistant
PLA programmable logic arrays
RAM random access memory
RISC reduced instruction set computer
ROM read-only memory
SaaS software as a service
SLA service level agreement
SRAM static random-access memory
WAN wide-area network

Cloud Computing In General

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 1:
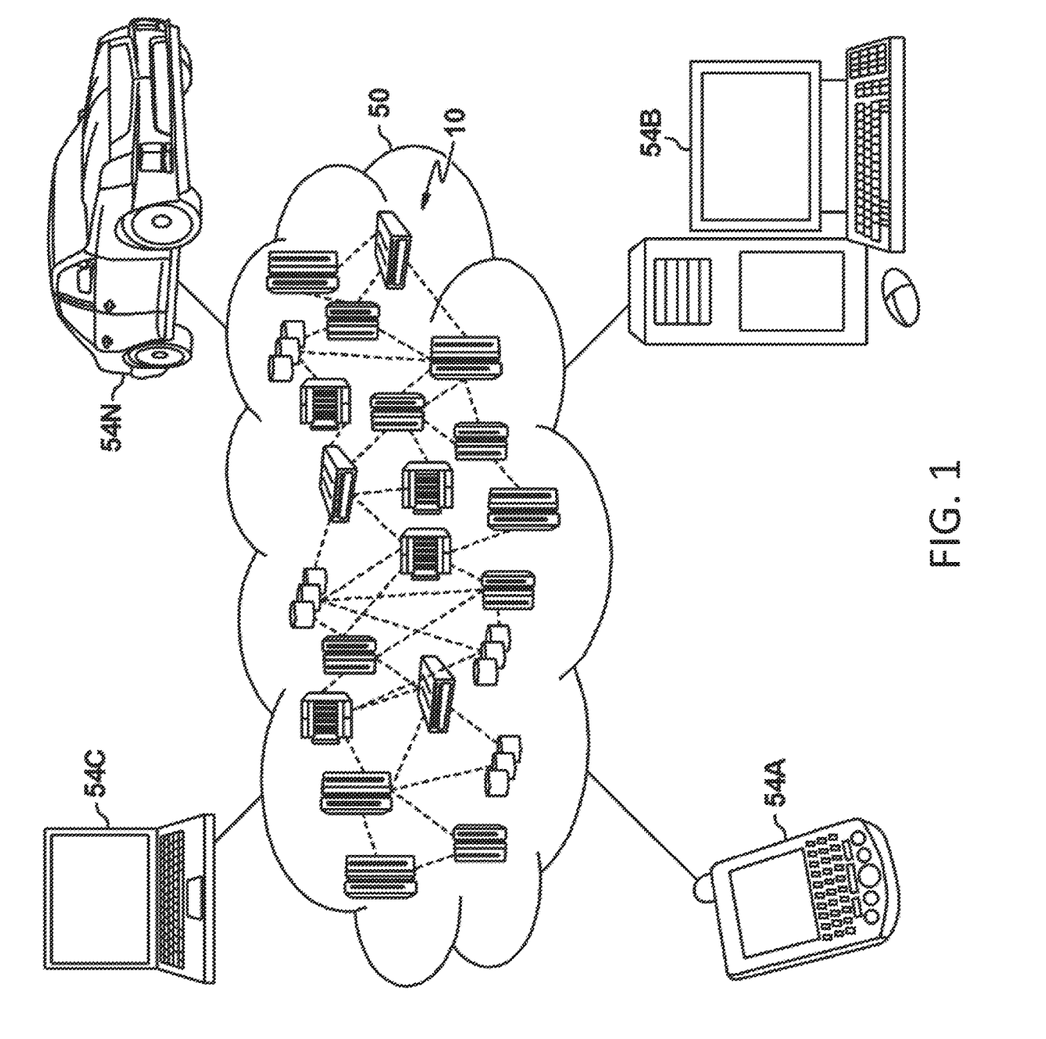
FIG. 1 depicts a cloud computing environment according to an embodiment of the present invention.

Referring now to FIG. 1, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
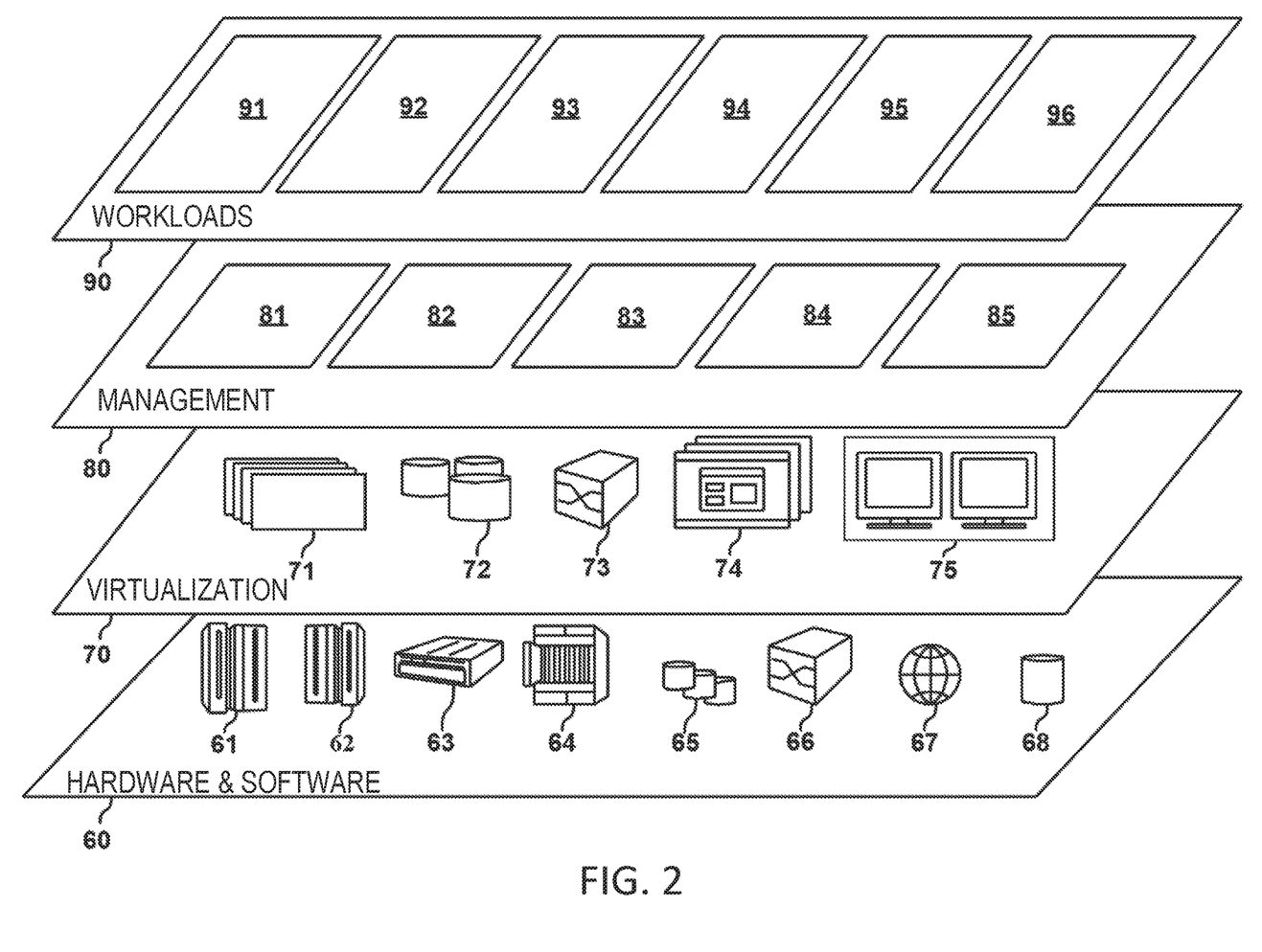
FIG. 2 depicts abstraction model layers according to an embodiment of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and mobile desktop 96.

Data Processing System in General

Figure 3:
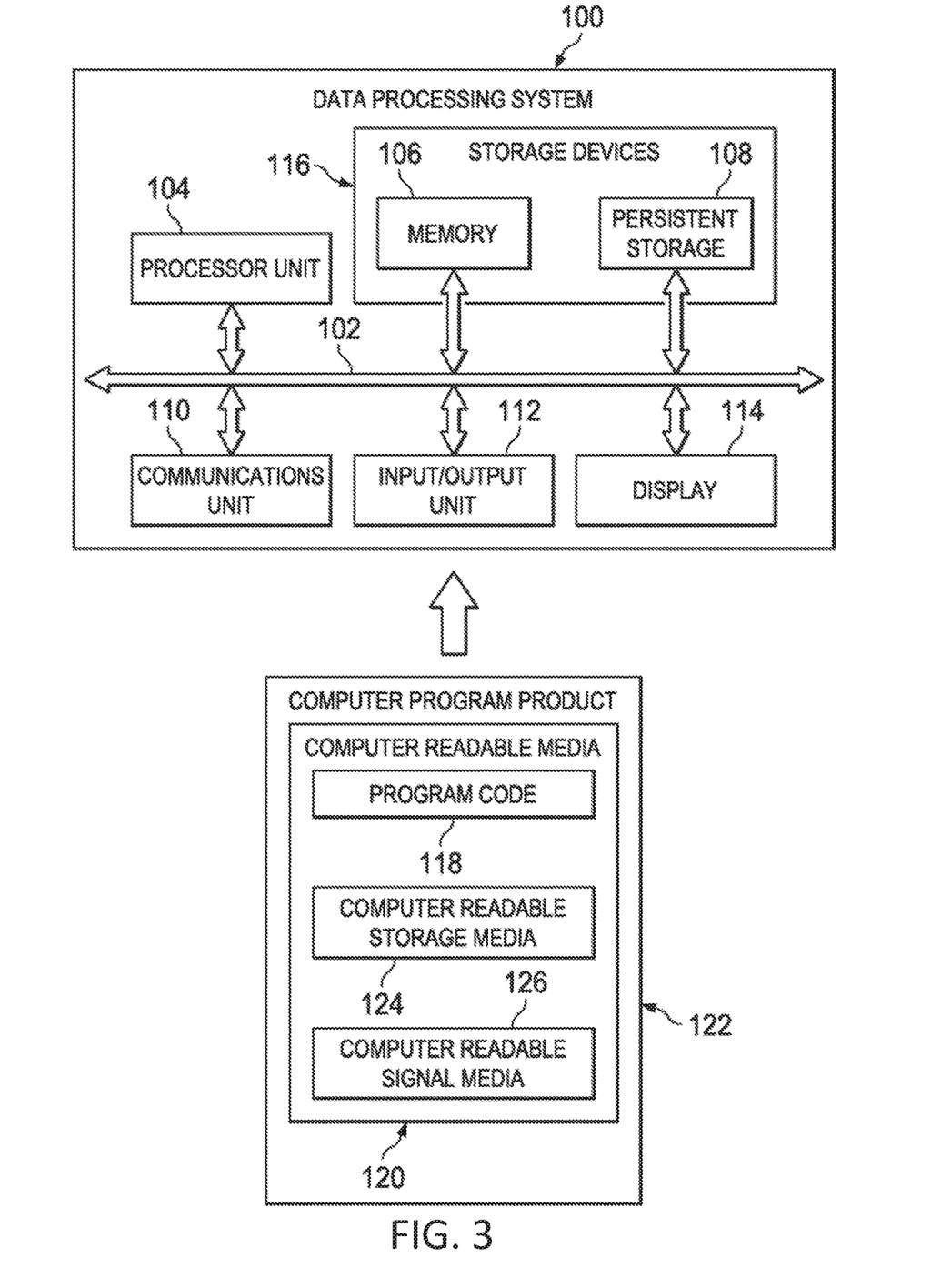
FIG. 3 is a block diagram of a DPS according to one or more embodiments disclosed herein.

FIG. 3 is a block diagram of an example DPS according to one or more embodiments. The DPS may be used as a cloud computing node 10. In this illustrative example, the DPS 100 may include communications bus 102, which may provide communications between a processor unit 104, a memory 106, persistent storage 108, a communications unit 110, an I/O unit 112, and a display 114.

The processor unit 104 serves to execute instructions for software that may be loaded into the memory 106. The processor unit 104 may be a number of processors, a multi-core processor, or some other type of processor, depending on the particular implementation. A number, as used herein with reference to an item, means one or more items. Further, the processor unit 104 may be implemented using a number of heterogeneous processor systems in which a main processor is present with secondary processors on a single chip. As another illustrative example, the processor unit 104 may be a symmetric multi-processor system containing multiple processors of the same type.

The memory 106 and persistent storage 108 are examples of storage devices 116. A storage device may be any piece of hardware that is capable of storing information, such as, for example without limitation, data, program code in functional form, and/or other suitable information either on a temporary basis and/or a permanent basis. The memory 106, in these examples, may be, for example, a random access memory or any other suitable volatile or non-volatile storage device. The persistent storage 108 may take various forms depending on the particular implementation.

For example, the persistent storage 108 may contain one or more components or devices. For example, the persistent storage 108 may be a hard drive, a flash memory, a rewritable optical disk, a rewritable magnetic tape, or some combination of the above. The media used by the persistent storage 108 also may be removable. For example, a removable hard drive may be used for the persistent storage 108.

The communications unit 110 in these examples may provide for communications with other DPSs or devices. In these examples, the communications unit 110 is a network interface card. The communications unit 110 may provide communications through the use of either or both physical and wireless communications links.

The input/output unit 112 may allow for input and output of data with other devices that may be connected to the DPS 100. For example, the input/output unit 112 may provide a connection for user input through a keyboard, a mouse, and/or some other suitable input device. Further, the input/output unit 112 may send output to a printer. The display 114 may provide a mechanism to display information to a user.

Instructions for the operating system, applications and/or programs may be located in the storage devices 116, which are in communication with the processor unit 104 through the communications bus 102. In these illustrative examples, the instructions are in a functional form on the persistent storage 108. These instructions may be loaded into the memory 106 for execution by the processor unit 104. The processes of the different embodiments may be performed by the processor unit 104 using computer implemented instructions, which may be located in a memory, such as the memory 106.

These instructions are referred to as program code, computer usable program code, or computer readable program code that may be read and executed by a processor in the processor unit 104. The program code in the different embodiments may be embodied on different physical or tangible computer readable media, such as the memory 106 or the persistent storage 108.

The program code 118 may be located in a functional form on the computer readable media 120 that is selectively removable and may be loaded onto or transferred to the DPS 100 for execution by the processor unit 104. The program code 118 and computer readable media 120 may form a computer program product 122 in these examples. In one example, the computer readable media 120 may be computer readable storage media 124 or computer readable signal media 126. Computer readable storage media 124 may include, for example, an optical or magnetic disk that is inserted or placed into a drive or other device that is part of the persistent storage 108 for transfer onto a storage device, such as a hard drive, that is part of the persistent storage 108. The computer readable storage media 124 also may take the form of a persistent storage, such as a hard drive, a thumb drive, or a flash memory, that is connected to the DPS 100. In some instances, the computer readable storage media 124 may not be removable from the DPS 100.

Alternatively, the program code 118 may be transferred to the DPS 100 using the computer readable signal media 126. The computer readable signal media 126 may be, for example, a propagated data signal containing the program code 118. For example, the computer readable signal media 126 may be an electromagnetic signal, an optical signal, and/or any other suitable type of signal. These signals may be transmitted over communications links, such as wireless communications links, optical fiber cable, coaxial cable, a wire, and/or any other suitable type of communications link. In other words, the communications link and/or the connection may be physical or wireless in the illustrative examples.

In some illustrative embodiments, the program code 118 may be downloaded over a network to the persistent storage 108 from another device or DPS through the computer readable signal media 126 for use within the DPS 100. For instance, program code stored in a computer readable storage medium in a server DPS may be downloaded over a network from the server to the DPS 100. The DPS providing the program code 118 may be a server computer, a client computer, or some other device capable of storing and transmitting the program code 118.

The different components illustrated for the DPS 100 are not meant to provide architectural limitations to the manner in which different embodiments may be implemented. The different illustrative embodiments may be implemented in a DPS including components in addition to or in place of those illustrated for the DPS 100. Other components shown in FIG. 1

Voice response systems (VRSs) continue to gain in popularity with users. These systems provide users with an easy-to-use interface via which users can obtain information, make requests, and otherwise interact with other systems either locally or remotely. The use of voice as input allows hands-free communication and interaction which may negate the need to interact with a computer and access the network via more traditional, cumbersome methods, such as via a keyboard. At a very basic level, the VRS comprises a microphone to input a user's voice and other sounds as analog signals. These analog signals may then be digitized and processed using relatively low-level speech-to-text algorithms. Once the speech has been converted to text, higher level processes may be used to make sense of the text. These processes may fall under the paradigm of natural language processing (NLP).

Voice recognition systems may come with an ability to "tune" the system to a particular user or set of users. The tuning may be provided using an artificial intelligence (AI) tool in a training mode in which, e.g., a user is asked to read some predefined text. The voice recognition system may take into account a specific user's manner of saying particular words. A number of parameters may be taken into account, including frequency/pitch of the user's voice, the user's cadence of the spoken word, pronunciation characteristics, and the like.

The VRS brings the voice recognition system to a higher level in that the VRS can may take the user's spoken word as a request to take a particular action based on it, which may come in the form of and/or include a vocalized response. Other actions may include searching for data, such as the current day's weather at the current location, and conveying it to the user, possibly in a consolidated, processed, or otherwise more meaningful form. Other actions may further include interacting with a device within the VRS's realm of control, such as turning on a house lamp. Additionally, the vocalized response may be used to solicit additional information from the user. Such additional information may be used to clarify or further refine a request, or to obtain related information.

The present disclosure relates to the technical problem of improving a man-machine interface in which communications from a computing device to a user are involved. In some instances, a user may be in a better situation to receive responses to requests, and it is beneficial for the VRS to determine or delineate between situations in which it is and is not suitable to provide a particular response. It would also be beneficial, when the VRS determines that the situation is not suitable to provide a particular response, that the VRS takes action that might help to improve the situation, preferably to a point that makes a non-suitable situation into a suitable one.

Disclosed herein is, according to various embodiments, a VRS that receives a request, assesses the suitability of a response to the request for a particular user in a particular situation, and, if the situation is not suitable, attempts to make the situation suitable so that the response can be provided. Various embodiments described herein may make use of a suitability of responding value (SRV). When a determined SRV is at or above a predefined threshold, the VRS may provide the response to the user, and when the SRV is below the predefined threshold, the VRS may not respond, delay responding until the SRV improves, or attempt to influence the user or control the context to improve the SRV. The SRV may be based on (or be a function of) at least one of two values: a) a user attentiveness value that is a measure of the user's state of mind, and b) a user context value that is a measure of distracting factors in the user's environment.

Figure 4:
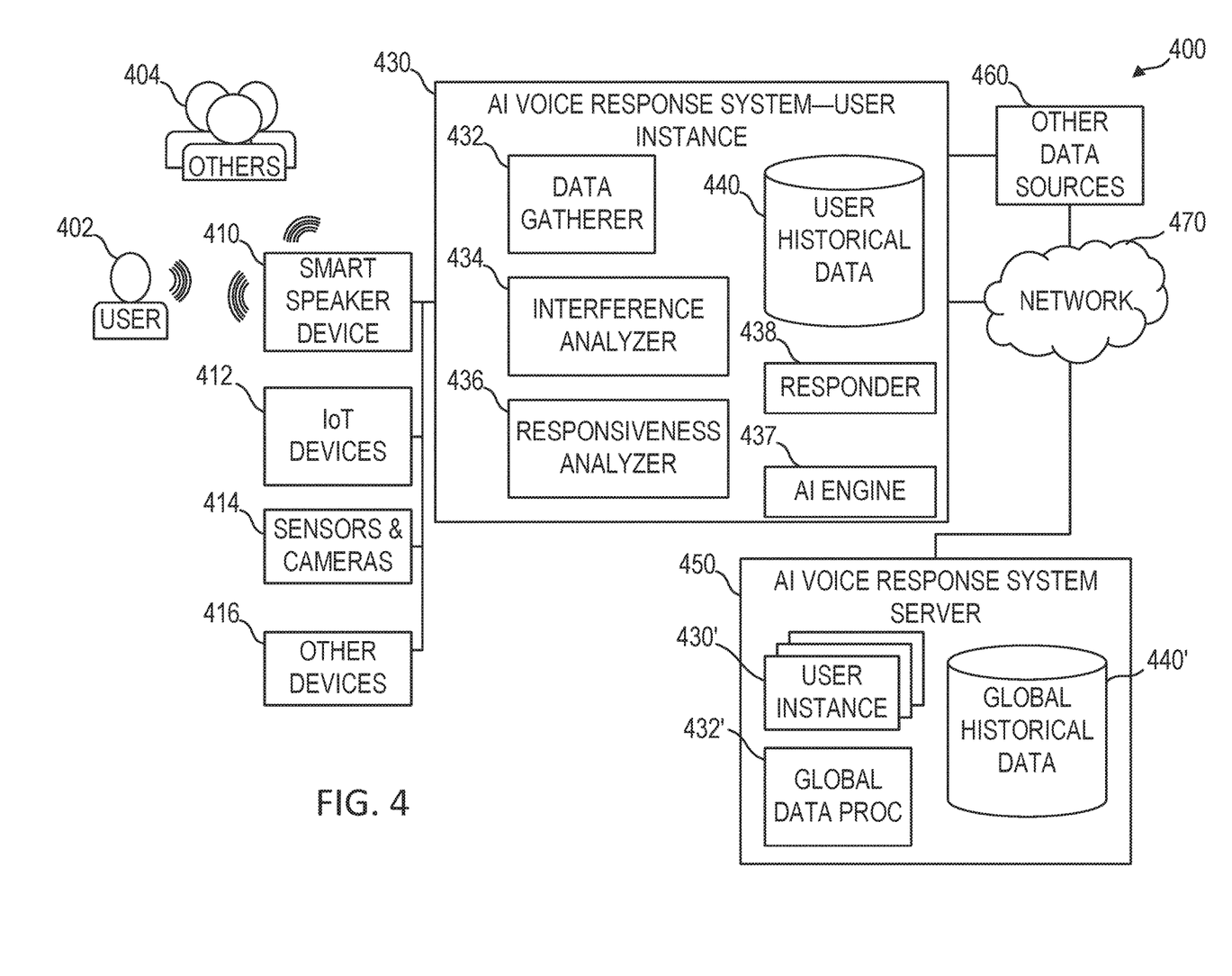
FIG. 4 is a block diagram of one or more embodiments of a voice response deliver system, according to some implementations.

FIG. 4 is a block diagram of an example VRS 400, according to some embodiments. The VRS 400 may comprise a number of devices, including a smart speaker device 410, IoT devices 412, sensors and cameras 414, and other devices 416. These devices may interact with a user instance of the AI VRS 430. The AI VRS 430 may comprise a data gatherer 432, an interference analyzer 434, a responsiveness analyzer 436, an AI engine 437, a responder 438, and a user historical database 440. The VRS 400 may include an AI VRS server 450 that contains a number of user instances 430', a global data processor 432', and global historical data 440'. The VRS 400 may also comprise other data sources 460 as well as a network 470 that interconnects the components.

A user 402 may interact with a smart speaker device (SSD) 410 associated with the user 402. The user 402 may make requests for information, such as asking for the day's weather forecast, who won the baseball game with the home team, and the like. The SSD 410 may be connected, via, e.g., a network 470 to other data sources 460 that can provide the requested information. For example, the SSD 410 may be connected in a household network to e.g., a router and modem via Wi-Fi to access a web site as an other data source 460 via the network 470, such as the Internet. The other data source 460 may provide information such as the daily weather forecast and other related information. When the user 402 speaks, her words are converted into text and then into meaningful requests using NLP that may be located, e.g., in the SSD 410. Certain words or phrases spoken by the user may then be converted into requests that may receive responses provided by the VRS 400. Some responses may be actions. For example, a spoken request to "turn on the living room lights" may be met with the VRS 400 communicating with light switch devices 416 in the living room to turn them on. Other responses are in the form of conveying information in spoken form, such as the request for the day's weather, discussed above.

Put simply, the VRS 400 analyzes the user's 402 voice request and accordingly responds to the request. The disclosure herein provides a system and method for a VRS 400 that makes use of acceptable thresholds of interference and attention specific to user clusters and a user's environment (also referred to herein as context). However, some of the voice responses may include require some conditions to be met prior to responding. One possible condition may be a threshold limit of the user's 402 attention level. Another possible condition may be an ambient noise level or a distraction-free space. If the user 402 is distracted, or not attentive, while a voice response is being delivered by the VRS 400, then the user 402 may not be able to receive or understand the contents of the response. Various embodiments of the VRS 400 discussed herein attempt to determine: the context of the user 402 in which the response may be provided, and whether a condition that might impede the user's 402 comprehension of the response is present. While delivering a voice reply, various external interruptions may distract the user 402, and the user 402 may not understand or get/take time to understand some of the voice reply. When such a condition is present, the VRS 400 may attempt to take action, if possible, to improve the context in which the response may be provided prior to providing the response. Thus, a method and system are described herein by which the VRS 400 may detect and predict external interruptions, identify how the VRS 400 responds, and adapt how the voice response may to be delivered within an acceptable level of interference.

There are, however, a number of additional factors that the VRS 400 may take into account. For example, some voice responses may not need the same level of attention as others. For example, a request for the results of the previous night's baseball game may not require the same level of attention as a request for how to deal with an accidental ingestion of a harmful substance. Another factor that may be taken into account is a user attention variance among users. The level of attention of any user 402, or external distracting factors, may vary from user to user in a particular environment and context.

The user's 402 state, as well as the context or environment, may be determined in a number of ways. In one implementation, IoT devices 412 or sensors and cameras 414 may be able to obtain information about the user 402 and/or the environment. In some embodiments, information about the user's attentive state may be determined by physiological attributes of the user 402, such as a level of user eye contact with an object, such as a user device, (e.g., a smartphone or other computing device) or other sensing device, or eye contact with various other objects such as other individuals 404, reading materials, and the like. Information about the user's attentive state may further be determined by a reply of the user 402 to the response. For example, if the user 402 requests that the SSD 410 repeat a particular response or asks the VRS 400 to play the response more slowly, this may indicate a lack of user attentiveness or proper context, and may be used by the VRS 400 to reassess the SRV. The SRV determination may be ongoing throughout the request and response (and possibly for some time after the response to obtain the user's 402 reaction to it).

The IoT devices 412, sensors and cameras 414, and other devices 416 (e.g., television sets or television remotes, kitchen appliances, thermometers, etc.) may detect or infer information about a user's 402 attentiveness prior to and during the response by considering attributes of the user (eye contact, as described above, posture, speed of activity (e.g., walking pace), sitting in an easy chair, etc.). Additionally, the IoT devices 412, sensors and cameras 414, and other devices 416 may also determine attributes of the context as well. For example, sensors such as, microphones may provide information about an overall sound level at the location of the user 402. Further, cameras may capture images that the VRS 400 uses to determine if others 404 in the room are talking or engaged in noisy activities. In some embodiments, the VRS 400 may calculate an attentiveness score for the user for predetermined periods of the day. For example, other devices 416, such as, a clock, may provide time-of-day so that variances in attentiveness based on time may also be determined. For example, if the user 402 is more of a morning person, an overall attentiveness score may be higher in the morning than in the evening (and vice versa).

An AI VRS user instance 430 may reside on a device associated with the user, such as a smart phone, personal computer, or any other DPS 100 under the user's control. VRS user instances 430' for the user 402 and other users may alternately or additionally reside on a VRS server 450, or portions of functionality of the VRS user instance 430 may be split between the user device(s) and the VRS server 450.

The user instance 430 may comprise a data gatherer 432 that gathers information from user devices and devices within the user's environment and may transform the gathered information for processing in a way that is easily digestible by other analyzers, such as an interference analyzer 434 and responsiveness analyzer 436. The gathered data that has been gathered by the data gatherer 432 may be analyzed to identify the level of interference (Lit1) (or user context value) and user's level of attention (Lat1) (or user attentiveness) at time t1 before providing a voice reply from VRS 400. If Lit1 is less than or equal to an acceptable threshold of interference, Lit1 and Lat1 are greater than or equal to an acceptable level of attention specific to the user and the environment, Lat1, then a response may be provided. Otherwise, the VRS 400 may take an action to bring the interference and attention to acceptable levels before responding. The VRS 400 may continue to track the interference and attention levels while the user is listening to voice response.

The interference analyzer 434 may be used to determine a degree of interference present (or potentially present) in the user's context or environment, such as the amount of noise, actual/potential distracting components, and the like. In some embodiments, noises made by others 404 may be in progress at the time the voice response is to be delivered. In this situation, the VRS 400 may address the crowd before delivering the reply. This addressing may be in the form of asking the others 404 to be quiet or pause their conversation, or it may be in the form of an attention generation sound, such as a tone, beeps, etc.

Thus, the interference analyzer 434 may be able to determine a level of noise being generated by others 404 in the proximity of the user 402. Such information may be usable by a responder 438 to take an action of requesting that other people 404 lower their voices/noise level in order to allow the user 402 to better receive the response. This request of others 404 may be directed to devices used by the other people 404, such as a request to lower their voices directed to the other peoples' 404 smartphones. Alternately, or additionally, this request of other people 404 may be directed to the SSD 410 to send out a loud voice response to the other people 404 to please quiet down so that the user 402 can better receive the response.

The interference analyzer 434 may also utilize information of IoT devices 412 and/or other devices 416 known to be in the proximity of the user 402 that could also be a potential source of interference. For example, the interference analyzer 434 may have information about the user's smart phone and thus indicate to the responder 438 that the phone should not be allowed to ring (or possibly vibrate) while the response is being provided. In another example, the interference analyzer 434 may have information about an IoT device 412, such as, an IoT doorbell, and thus indicate to the responder 438 that the doorbell should not be allowed to operate while the response is being provided. In some embodiments, the doorbell (or other distracting element) may simply be delayed until the reply has been provided.

Other interference-reducing activities may be provided by the combination of the interference analyzer 434 and the responder, such as directing a user's computer to not change screens, display popups, messages, or any other form of potentially distracting communication. Television sets or radios may be asked to reduce distracting actions by doing activities such as turning down volume, reducing display brightness, screen changes, and the like.

In some embodiments, the VRS 400 may be able to predict certain interrupts. Such predictions may be made by analyzing the surrounding context, a user's (or other) calendar or schedule, user historical data 440, etc. In one example, the VRS 400 may be able to determine from the user historical data 440 that the user leaves for work every workday morning at 7:45 am, and that times near this are not good times, since the user may be distracted with last minute preparations. Such a determination may be made by solely looking at historical patterns of the user, without consulting a user calendar or schedule). The VRS 400 may then determine that better times to deliver a response are before 7:30 am, prior to the user's final preparations for work travel, or 8:15 am, after the user has already arrived at work and gotten settled in. In this way, the VRS 400 may identify appropriate timing to deliver the reply—the VRS 400 may wait until the appropriate time, the interruption is ended, or the interference level is acceptable.

If the VRS 400 has detected that the SRV is below the threshold, it may attempt to obtain a better value by directing other devices 416 that may potentially create a sound, display, or other distracting action, to remain silent for some amount of time during which the reply may be delivered (the VRS 400 may be able to determine the amount of time it takes to generate and/or deliver the reply based on its knowledge of typical times of spoken text). IoT devices 412 (the other devices 416 may also include IoT devices 412) may, in particular, have the intelligence to respond to a request for silence or to prioritize a display to avoid display changes. In some embodiments, one of the devices 412, 416 may be able to respond that it has a shorter window of possible silence than is required for the reply. In such a situation, the responder 438 may be able to compress the reply into a smaller timeframe as, e.g., indicated by the device 412, 416 using known techniques.

The responsiveness analyzer 436 may operate in a similar manner in that it may receive information from sensors and cameras 414, and the like via the data gatherer 432, and determine a degree of user responsiveness based on, e.g., physiological factors (stare time at particular objects, posture, speed of body motion, etc.) If the user appears to be distracted, the responder 438 may be able to improve the user's situation by requesting a change of location (e.g., "please step outside to receive the response").

Information about the user's responsiveness and the user's environment may be stored in a user historical database 440. Thus, the ability of the user 402 to digest various responses in given contexts/environments and based upon various physiological characteristics of the user may be stored in the user historical data base 440. The data in the user historical database 440 may be utilized by an AI engine 437 to better predict the user's ability to digest the responses. A user knowledge corpus in the user historical data 440 may be created by learning about a user's 402 distraction patterns due to external influencing factors, mental conditions, sources of external influencing factors, ability to remember the voice reply, importance of the voice reply, etc. This knowledge corpus may be used to predict when voice response is to be delivered without (or by minimizing) surrounding disturbing factors or when there is an acceptable level of interference. The AI engine 437 may, in some embodiments, be utilized to determine one or more of the following: a) why user needs the VRS 400 to repeat responses; b) what the user's 402 level of attention was while listening to the voice response in correlation to the surrounding environment and context variables; c) why the user's 402 level of attention was low; d) why the user 402 missed the reply from the VRS 400; e) what type of voice responses the user 402 needs repeat replies for, f) what should be the level of attention while listening to different types of contents be, and other questions.

The user knowledge corpus may reside in a user instance 430, 430' that may reside on a device of the user or on a server. The user knowledge corpus may also reside in a location independent of the user instance. In addition to a user knowledge corpus comprising AI data, information from a plurality of users may be aggregated in a global historical database 440'. In some embodiments, similar user profiles may be clustered to derive user clusters requiring the same or similar thresholds of attention and interference. In order to derive user clusters, in some embodiments, user demographics may be taken into account as well as user habits (e.g., a morning person vs. an evening person). In some embodiments, the grouping of users may be performed by statistical analysis of historical data. This information may be handled with a global data processor 432' in a manner similar to the interference analyzer 434 and responsiveness analyzer 436 but without individualized data designed for a particular user 402.

The global historical database 440' (aka "knowledge corpus") may be created leveraging known correlation techniques that correlate parameters defining scenarios in previous steps with specific users or user clusters and their acceptable level of interference and required levels of attention for specific responses. Rules may be formulated from data within the global historical database 440', and these rules from this knowledge corpus may be stored in a cloud architecture and shared for users in same user cluster (with an appropriate level of privacy and user consent). These rules may then be leveraged to adjust the delivery of response to a user or users in the same user cluster, and may be particularly helpful when little user historical data 440 exists for a specific user 402.

With regard to the importance of a response, the VRS 400 may factor in an importance rating of the response in order to determine a proper response. Based on an identified level of importance of the voice reply, the VRS 400 may help to ensure that a predetermined user attention level is present or restored, so that user can understand the voice reply. By way of example, a response that includes a game score may have a relatively low importance rating, in contrast to a request for dealing with poison ingestion that may have a relatively high importance rating.

The SSD 410, IoT devices 412, other devices 416, and the AI VRS server 450 may, for example, be configured as the DPS 100 described above, containing similar components. The network 470 may, for example, be configured as cloud computing environment 50, as described above, or incorporate any form of LAN and/or WAN to wirelessly or in a wired manner transmit the data. The AI voice response system user instance 430 may be run on a device that is also configured as the DPS 100 described above.

Figure 5:
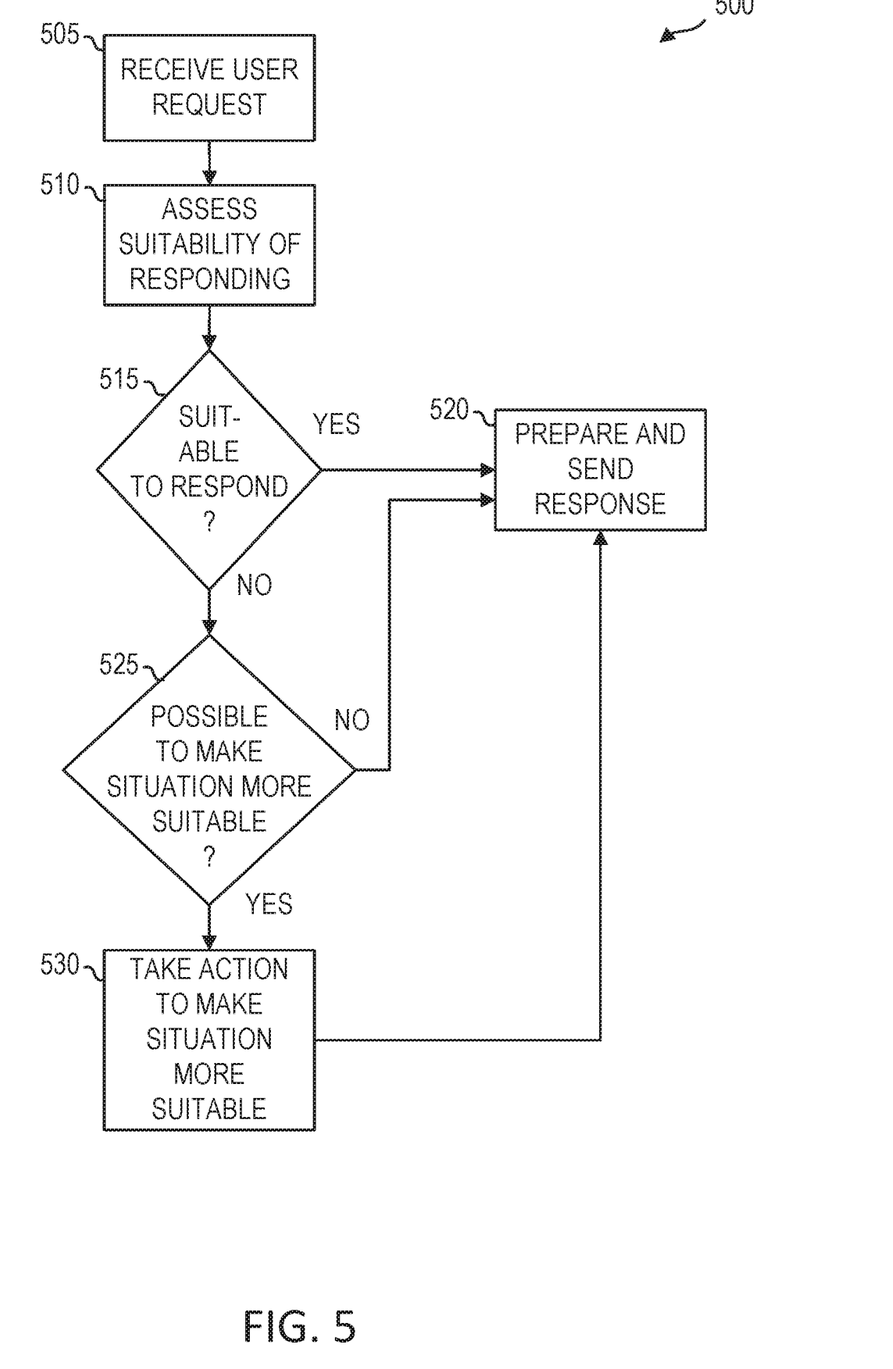
FIG. 5 is a flowchart of an example voice response delivery system process, according to some implementations.

FIG. 5 is an example process 500, according to some embodiments, for responding to a user in response to a request. In operation 505, the data gatherer 432 may receive a user request. The user request may be a voice request, and the data gatherer 432 may convert an analog signal received from a microphone of the SSD 410, digitally convert it and process the user's 402 words using NLP. In operation 510, the VRS 400 may assess the suitability of responding by determining an SRV to determine whether or not it meets a threshold. This determination may take into account a user attentiveness value that may be based on observed attributes of the user 402, and a user context value that may be based on an environment in which the user 402 is in.

In operation 515, a determination may be made as to whether the SRV is of a value that meets or exceeds a threshold, thus triggering a response. For example, if the SRV meets or exceeds the threshold (515: YES), then, in operation 520, the response may be prepared and sent. If the SRV does not meet or exceed the threshold (515: NO), then, in operation 525, a determination is made as to whether it may be possible to improve the SRV. If not (525: NO), then, in operation 520, the response may be prepared and sent. FIG. 5 shows only one possible response if the situation cannot be made more suitable. Other possible responses are to save the response to a time when it is more suitable to respond or to take some other action described herein.

If it is possible to make the situation less distracting (525: YES), then the VRS 400, in operation 530, may take an action to make the situation more suitable. This may be done, for example, by controlling other devices 416, IoT devices 412, others 404, etc. Once this is done, the VRS 400 may loop back to operation 520 to prepare and send the response. Another possibility at this point may be to return back to operation 515 or operation 510 in order to determine if the action taken was sufficient to overcome the suitable to respond threshold.

Computer Technology

The one or more embodiments disclosed herein accordingly provide an improvement to computer technology. For example, an improvement to user-computer voice-related communications allows for a more efficient and effective sharing of information. The ability to consider a user's ability and context for receiving a response to a request may allow more effective communications to take place.

Computer Readable Media

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method comprising:
   receiving an audio user request from a user;
   converting the request into a digitized request using natural language processing;
   determining a suitability of responding value (SRV); and
   responsive to a determining that the SRV is equal to or above a predetermined threshold value, providing a response to the user request;
   wherein the SRV is based on a user attentiveness value and a user context value.

2. The method of claim 1, further comprising:
   responsive to a determining that the SRV is below the predetermined threshold value, performing an action selected from the group consisting of:
      a) waiting until the SRV is equal to or above the predetermined threshold value, and responsive thereto, providing the response to the user request; and
      b) determining a possibility of improving the SRV;
   responsive to a positive determination of improving the SRV, taking an action to improve the SRV and then subsequently providing a response to the user request; and
   responsive to a negative determination of improving the SRV, providing a response to the user request without taking an action to improve the SRV.

3. The method of claim 1, further comprising:
   receiving data from a device comprising physiological data of the user; and
   determining the user attentiveness value based on the physiological data of the user.

4. The method of claim 3, wherein the physiological data of the user is based on data selected from the group consisting of: a user's gaze time at an object, a user's posture, and a user's response time to previous responses.

5. The method of claim 1, further comprising, responsive to the receiving of the user request:
   determining a current distraction level of the user based on historical patterns of distraction levels, wherein the historical patterns of distraction levels comprise one or more historical interactions of the user that have each been identified as a respective historical distraction, wherein the historical patterns of distraction levels further comprise, for each of the one or more historical interactions of the user, a respective historical context that caused a respective historical distraction; and
   predicting a time in which the user's determined distraction level is below an acceptable threshold based on a determination of importance of the request.

6. The method of claim 1, further comprising:
   responsive to detecting an interruption in a delivery of a response to the received request, determining a distraction level of the user associated with the interruption of the delivery; and
   refocusing the user's attention to the delivery of the response by transmitting an alert to the user, wherein the alert is one or more sounds.

7. The method of claim 6, further comprising delivering a response to the received request at a predicted time in which the determined distraction level of the user is below an acceptable threshold.

8. The method of claim 1, further comprising determining acceptable thresholds of interference and attention that are specific to user clusters.

9. The method of claim 1, further comprising predicting, at a time of the response and based on historical data, levels of interference in both a user's environment and context.

10. The method of claim 1, further comprising:
    performing, based on user reactions and based on follow up questions from users or commands from users, self-learning; and
    enhancing, for specific users and users in a same user cluster, a knowledge corpus for actions and responses.

11. The method of claim 1, further comprising:
    performing, based on user reactions and based on follow up questions from users or commands from users, self-learning; and
    adjusting acceptable thresholds of interference and required thresholds of attention for specific users and users in a same user cluster.

12. A voice response delivery system, comprising:
    a processor configured to:
       receive an audio user request from a user;
       convert the request into a digitized request using natural language processing;
       determine a suitability of responding value (SRV); and
       responsive to a determination that the SRV is equal to or above a predetermined threshold value, provide a response to the user request;
    wherein the SRV is based on a user attentiveness value and a user context value.

13. The system of claim 12, wherein the processor is further configured to:
    responsive to a determination that the SRV is below the predetermined threshold value, perform an action selected from the group consisting of:
       a) wait until the SRV is equal to or above the predetermined threshold value, and responsive thereto, provide the response to the user request; and
       b) determine a possibility to improve the SRV;

responsive to a positive determination to improve the SRV, take an action to improve the SRV and then subsequently provide a response to the user request; and responsive to a negative determination to improve the SRV, provide a response to the user request without taking an action to improve the SRV.

14. The system of claim 12, wherein the processor is further configured to:

receive data from a device comprising physiological data of the user; and determine the user attentiveness value based on the physiological data of the user.

15. The system of claim 14, wherein the physiological data of the user is based on data selected from the group consisting of: a user's gaze time at an object, a user's posture, and a user's response time to previous responses.

16. The system of claim 12, wherein the processor is further configured to, responsive to the receiving of the user request:

determine a current distraction level of the user based on historical patterns of distraction levels, wherein the historical patterns of distraction levels comprise one or more historical interactions of the user that have each been identified as a respective historical distraction, wherein the historical patterns of distraction levels further comprise, for each of the one or more historical interactions of the user, a respective historical context that caused a respective historical distraction; and predict a time in which the user's determined distraction level is within below an acceptable threshold based on a determination of importance of the request.

17. The system of claim 12, wherein the processor is further configured to:

responsive to a detection of an interruption in a delivery of a response to the received request, determine a distraction level of the user associated with the interruption of the delivery; and refocus the user's attention to the delivery of the response by transmitting an alert to the user, wherein the alert is one or more sounds.

18. The system of claim 12, wherein the processor is further configured to predict, at a time of the response and based on historical data, levels of interference in both a user's environment and context.

19. A computer program product, the computer program product comprising a computer readable storage medium having computer-readable program instructions embodied therewith which, when executed on a processor, cause the processor to:

receive an audio user request from a user;

convert the request into a digitized request using natural language processing;

determine a suitability of responding value (SRV); and responsive to a determination that the SRV is equal to or above a predetermined threshold value, provide a response to the user request;

wherein the SRV is based on a user attentiveness value and a user context value.

20. The computer program product of claim 19, wherein the instructions, when executed on the processor, cause the processor to:

responsive to a determination that the SRV is below the predetermined threshold value, perform an action selected from the group consisting of:

a) wait until the SRV is equal to or above the predetermined threshold value, and responsive thereto, provide the response to the user request; and b) determine a possibility to improve the SRV;

responsive to a positive determination to improve the SRV, take an action to improve the SRV and then subsequently provide a response to the user request; and responsive to a negative determination to improve the SRV, provide a response to the user request without taking an action to improve the SRV.

* * * * *